US008103790B2

(12) United States Patent
Turk

(10) Patent No.: US 8,103,790 B2
(45) Date of Patent: Jan. 24, 2012

(54) APPARATUS AND METHOD FOR SUPPORTING MULTIPLE TRAFFIC CATEGORIES AT A SINGLE NETWORKED DEVICE

(75) Inventor: Doughan A. Turk, Mississauga (CA)

(73) Assignee: BCE Inc., Verdun, Quebec (CA)

( * ) Notice: Subject to any disclaimer, the term of this patent is extended or adjusted under 35 U.S.C. 154(b) by 1475 days.

(21) Appl. No.: 11/568,919

(22) PCT Filed: Dec. 20, 2005

(86) PCT No.: PCT/CA2005/001933

§ 371 (c)(1), (2), (4) Date: Nov. 10, 2006

(87) PCT Pub. No.: WO2007/071004

PCT Pub. Date: Jun. 28, 2007

(65) Prior Publication Data

US 2009/0129369 A1 May 21, 2009

(51) Int. Cl.
*G06F 15/173* (2006.01)

(52) U.S. Cl. ......................... 709/238; 709/245; 709/224

(58) Field of Classification Search .................. 709/238, 709/224, 245

See application file for complete search history.

(56) References Cited

U.S. PATENT DOCUMENTS 6,081,524 A * 6/2000 Chase et al. .................. 709/250
6,351,464 B1 2/2002 Galvin et al.
6,556,547 B1 4/2003 Srikanth et al.
6,813,264 B2 11/2004 Vassilovski
6,816,456 B1 * 11/2004 Tse-Au ......................... 709/240
6,956,820 B2 10/2005 Zhu et al.
7,143,442 B2 * 11/2006 Scarfe et al. .................... 726/23
7,289,514 B2 * 10/2007 Robotham et al. ............ 709/229
7,366,894 B1 * 4/2008 Kalimuthu et al. ........... 713/153
7,596,811 B2 * 9/2009 Lloyd et al. ................... 709/224
7,633,942 B2 * 12/2009 Bearden et al. ............... 709/224
7,698,548 B2 * 4/2010 Shelest et al. ................ 713/154

(Continued)

FOREIGN PATENT DOCUMENTS

GB 2391742 7/2004

(Continued)

OTHER PUBLICATIONS

S. Bellovin, On Many Addresses per Host, Aug. 1994, 5 pages, http://rfc1681.x42.com/t/.

(Continued)

*Primary Examiner* — Philip B Tran

(57) ABSTRACT

An apparatus comprising a first and a second functional entity operable for supporting traffic in, respectively, first and second traffic categories across a communications network. The second traffic category is associated with specific routing requirements. A network interface releases a request for a first address and a request for a second address. The request for a second address comprises data that is instrumental in causing the second address to be assigned by an address-assigning entity from a particular set of at least one address. The network is pre-configured to route traffic destined for a given address in the particular set of at least one address in accordance with the specific routing requirements. Receipt of the first address from the address-assigning entity enables the first functional entity to act as a receptor of traffic in the first traffic category, while receipt of the second address enables the second functional entity to act as a receptor of traffic in the second traffic category.

75 Claims, 11 Drawing Sheets

| Traffic Category | IP Subnet |
|---|---|
| VoIP | 192.168.12.0/23 |
| Data | 211.104.127.0/28 |
| Email | SUBNET_3 |
| Gaming | SUBNET_4 |
| Video | SUBNET_5 |

U.S. PATENT DOCUMENTS

| | | | | |
|---|---|---|---|---|
| 2003/0212800 | A1 * | 11/2003 | Jones et al. | 709/229 |
| 2004/0028028 | A1 * | 2/2004 | Kwak | 370/352 |
| 2004/0103021 | A1 * | 5/2004 | Scarfe et al. | 705/13 |
| 2004/0249891 | A1 | 12/2004 | Khartabil et al. | |
| 2005/0073964 | A1 * | 4/2005 | Schmidt et al. | 370/352 |
| 2006/0088034 | A1 * | 4/2006 | Santitoro | 370/395.21 |
| 2007/0002833 | A1 * | 1/2007 | Bajic | 370/352 |
| 2007/0067823 | A1 * | 3/2007 | Shim et al. | 726/2 |

FOREIGN PATENT DOCUMENTS

WO PCT/CA2005/001933 10/2006

OTHER PUBLICATIONS

Knight et al., Virtual Router Redundancy Protocol, Apr. 1998, 25 pages, http://rfc.sunsite.dk/rfc/rfc2338.html.

Kaouthar Sethom et al., Adaptation Interface for Seamless Handover between 802.20MBWA/802.11/802.15, Nov. 5, 2003, 5 pages.

ISis Image Stream Internet Solutions, Virtual Router Redundancy Protocol White Paper, Jun. 9, 2004, 20 pages.

Resonate, Resonate Central Dispatch An In-Depth Technical White Paper, 22 pages, http://www.resonate.com/sol_lit_rcd_depth.html.

Mark A. Lipford, 3GPP2 Wireless Networks Evolution to IP and IP v6, 17 pages, http://playground.sun.com/ipv6/presentations/May2001/3GPP2.pdf.

Adnan Onart et al., Addison-Wesley, A Few Words About Router Virtually, Jan. 31, 2003, 3 pages, http://www.awprofessional.com/articles/article.asp?p=30172&seqNum=10&rl=1.

Quentin Cregan, Linux Magazine, How do I get multiple IP addresses on a single network card?, Aug. 15, 2001, 4 pages, http://www.linux-mag.com/content/view/844/43/.

Vrrpd is a deamon which support the VRRP v2 protocol as specified in rfc2338., 2 pages, http://off.net/~jme/vrrpd/FAQ.

John Ionnidis, "Configuring Multiple IP Addresses", http://httpd.apache.org/docs/1.3/misc/vif-info.html, 1994, 7 pages.

Office Action issued on Feb. 1, 2011 in connection with Canadian Patent Application 2,570,711, 3 pages.

* cited by examiner

Display 112
Keyboard 114
Mouse 116
Speaker 117
Microphone 119
Computing Apparatus 100
Input/Output Interface 110
Internet Browser 108
Soft Client 106
Network Interface 102
Access Network 104
Address Server 124
Database 138
Router 126
Router 128
Database 146
Database 148
Backbone Network 120
Router 130
Router 132
Database 150
Database 152
Access Network 122
VoIP Phone 136
Web Server 134

Database 138

| Traffic Category | IP Subnet |
| --- | --- |
| VoIP | 192.168.12.0/23 |

FIG. 2B

Display 112
Keyboard 114
Mouse 116
Speaker 117
Microphone 119
Computing Apparatus 100
Input/Output Interface 110
Soft Client 106
Internet Browser 108
Network Interface 102
412
400
Access Network 104
Address Server 124
Database 138
Router 126
Router 128
Database 146
Database 148
Backbone Network 120
Router 130
Router 132
Database 150
Database 152
Access Network 122
VoIP Phone 136
Web Server 134

Display 112
Keyboard 114
Mouse 116
Speaker 117
Microphone 119
Computing Apparatus 100
Input/Output Interface 110
Internet Browser 108
Soft Client 106
Network Interface 102
180A
190A
Access Network 104
Address Server 124
Database 138
Router 126
Router 128
Database 146
Database 148
190B
180C
200B
200A
Backbone Network 120
180B
Router 130
Router 132
Database 150
Database 152
Access Network 122
VoIP Phone 136
180D
180E
190C
Web Server 134

| Traffic Category | IP Subnet |
|---|---|
| VoIP | 192.168.12.0/23 |
| Data | 211.104.127.0/28 |
| Email | SUBNET_3 |
| Gaming | SUBNET_4 |
| Video | SUBNET_5 |

Input/Output Interface 110
Soft Client 106
Network Interface 102
Computing Apparatus 100**
Access Network 104
Address Server 124
Traffic Category
IP Subnet
Secure VoIP
SUBNET_6
Non-Secure VoIP
SUBNET_7
838
Router 126
Router 128
Database 146
Database 148
820
822
Backbone Network 120
Router 130
Router 132
Database 150
Database 152
Access Network 122
VoIP Phone 136

Computing Apparatus 100***
Input/Output Interface 110
Internet Browser 108
Network Interface 102
Access Network 104
Address Server 124
938
Traffic Category
IP Subnet
Secure VoIP
SUBNET_8
Non-Secure VoIP
SUBNET_9
Router 126
Router 128
Database 146
Database 148
920
922
Backbone Network 120
Router 130
Router 132
Database 150
Database 152
Access Network 122
Web Server 134

APPARATUS AND METHOD FOR SUPPORTING MULTIPLE TRAFFIC CATEGORIES AT A SINGLE NETWORKED DEVICE

FIELD OF THE INVENTION

The present invention relates generally to telecommunications and, in particular, to solutions for supporting multiple traffic categories at a single networked device.

BACKGROUND OF THE INVENTION

Through recent technological advances, the ability exists today to exchange voice communications over a packet network, and this has begun to revolutionize the telecommunications industry. Specifically, a customer who has Internet access can now make telephone calls through the packet network, in this way bypassing the existing communications infrastructure and consequently avoiding the hefty long distance fees charged by incumbent local exchange carriers.

In one scenario, to be able to place voice-over-packet (usually referred to as VoIP) telephone calls, the customer may purchase a specialized telephone handset that has certain features characteristic of a networked device, such as the ability to exchange packets over a packet network. Alternatively, the customer can utilize a conventional telephone fitted with an analog terminal adapter (ATA) that provides the necessary voice-to-packet translation and vice versa. Yet a third option has become available, whereby the same computer that is used to gain Internet access is also used as a telephony device by running specialized software and utilizing the computer's built in microphone and speaker. In this last scenario, the computer runs what can be referred to as a "soft client". The advantages of a soft client are principally in the areas of practicality, reconfigurability and cost. These advantages flow from exploiting the same Internet connection to support both an Internet access tool (e.g., a web browser) and the soft client.

Unfortunately, current soft client implementations suffer from several drawbacks, at least one of these being due to the very fact that the same Internet connection is shared by both a soft client and a web browser. Specifically, where a VoIP call may require special treatment by routers in the packet network (e.g., from a security, bandwidth or priority perspective), such treatment is not achievable since the computer running both the soft client and the web browser communicates using a single IP address. Stated differently, the packet network cannot make the distinction between VoIP traffic and non-VoIP traffic on the basis of a packet's IP address.

To remedy this situation, some proposals have called for the use of a dedicated port for VoIP traffic that would be appended to the IP address. Routers in the network would then need to recognize the port when performing a forwarding operation. However, this solution is not universal, since many routers are configured to ignore the port and instead perform routing solely on the basis of a packet's 32-bit destination IP address.

Thus, it would be desirable to overcome the difficulties mentioned above so as to allow VoIP calls to be differentiated in the packet network, in order to meet certain specific security, bandwidth or priority requirements, for example.

SUMMARY OF THE INVENTION

A first broad aspect of the present invention seeks to provide an apparatus comprising a first and a second functional entity operable for supporting traffic in, respectively, first and second traffic categories across a communications network. The second traffic category is associated with specific routing requirements. A network interface releases a request for a first address and a request for a second address. The request for a second address comprises data that is instrumental in causing the second address to be assigned by the address-assigning entity from a particular set of at least one address. The network is pre-configured to route traffic destined for a given address in the particular set of at least one address in accordance with the specific routing requirements. Receipt of the first address from an address-assigning entity enables the first functional entity to act as a receptor of traffic in the first traffic category, while receipt of the second address enables the second functional entity to act as a receptor of traffic in the second traffic category.

A second broad aspect of the present invention seeks to provide a method for responding to an address request. The method comprises determining a traffic category associated with the address request; consulting a database in an attempt to identify a set of at least one available address corresponding to the determined traffic category; responsive to identification of a set of at least one available address corresponding to the determined traffic category, selecting an available address in the set; and releasing the selected address to an originator of the address request.

Another broad aspect of the present invention seeks to provide a computer-readable medium comprising computer-readable program code which, when interpreted by a computing apparatus, causes the computing apparatus to execute the aforementioned method of responding to an address request.

A further broad aspect of the present invention seeks to provide a network architecture, which comprises a plurality of routers capable of routing traffic through a backbone network, the routers being configured to route traffic destined for a given address in a particular set of at least one address in accordance with specific routing requirements. The network architecture also comprises a computing apparatus, which includes a first functional entity operable for supporting traffic in a first traffic category across the backbone network; a second functional entity operable for supporting traffic in a second traffic category across the backbone network, the second traffic category being associated with said specific routing requirements through the backbone network; and a network interface. The network interface is operable for releasing a request for a first address and a request for a second address. Receipt of the first address from an address-assigning entity enables the first functional entity to act as a receptor of traffic in the first traffic category that is destined for the computing apparatus. Receipt of the second address from the address-assigning entity enables the second functional entity to act as a receptor of traffic in the second traffic category that is destined for the computing apparatus. In addition, the request for a second address comprises data instrumental in causing the second address to be assigned by the address-assigning entity from said particular set of at least one address.

These and other aspects and features of the present invention will now become apparent to those of ordinary skill in the art upon review of the following description of specific embodiments of the invention in conjunction with the accompanying drawings.

BRIEF DESCRIPTION OF THE DRAWINGS

In the accompanying drawings:

FIG. 2B is an example of a database stored in the address-assigning entity, which maps a particular differentiated traffic category to a corresponding IP subnet;

It is to be expressly understood that the description and drawings are provided only for the purpose of illustration of certain embodiments of the invention and are an aid for understanding. They are not intended to be a definition of the limits of the invention.

DETAILED DESCRIPTION OF EMBODIMENTS

Figure 1:
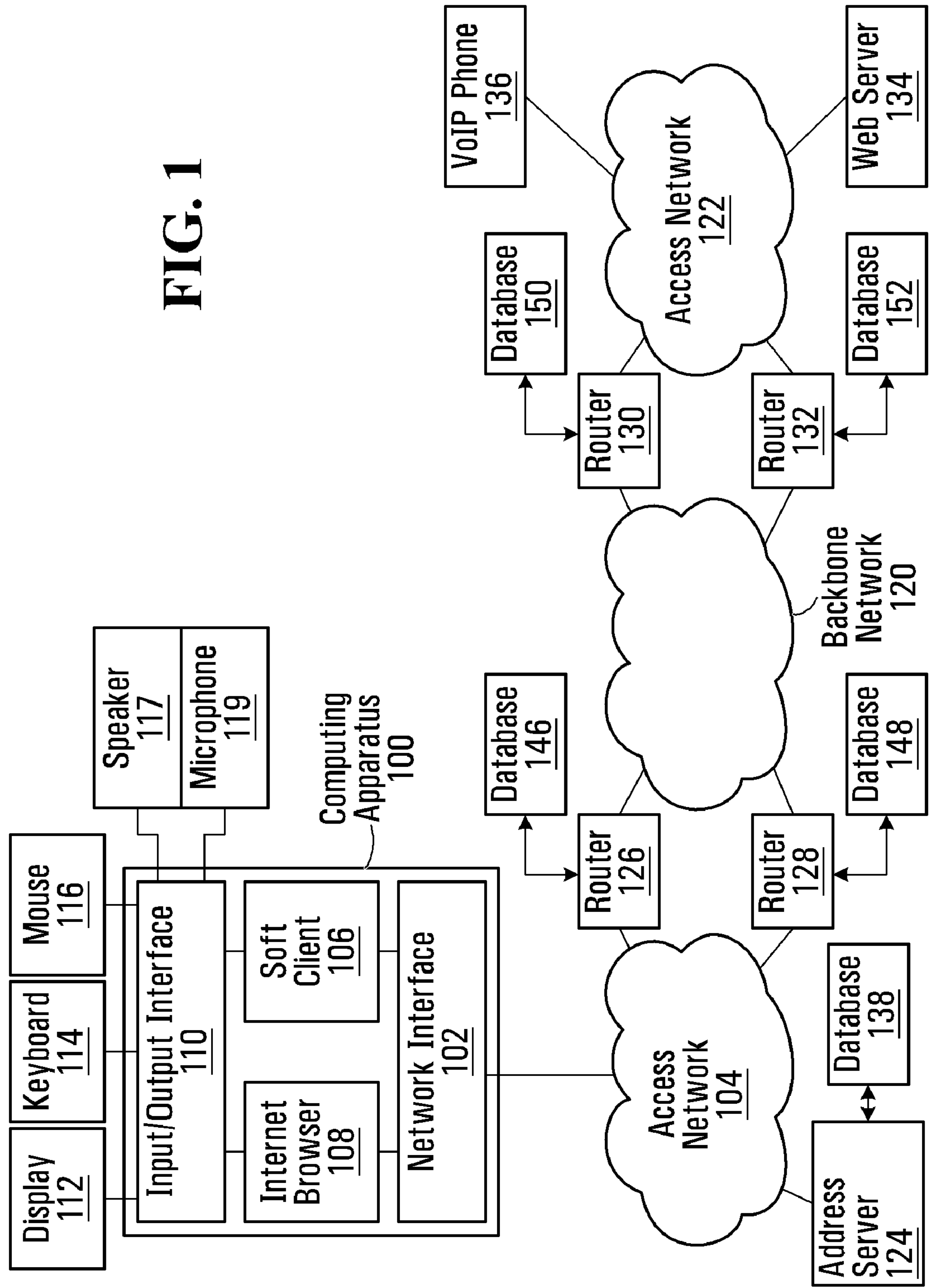
FIG. 1 shows a block diagram of a network architecture comprising a computing apparatus communicatively coupled to an address-assigning entity.

FIG. 1 shows a network architecture in which there is provided a computing apparatus 100 equipped with a network interface 102 that connects the computing apparatus 100 to an access network 104. The implementation of the computing apparatus 100 is not particularly limited. While in the embodiment of FIG. 1, the computing apparatus 100 is portrayed as having certain features characteristic of a desktop or laptop computer, it should be understood that in other embodiments, the computing apparatus 100 may be implemented as a networked personal digital assistant (e.g., BlackBerry™, Treo™, Razr™), an Internet-enabled cellular telephone, a service kiosk, an automatic teller machine (ATM), and so on.

Generally speaking, the functionality of certain portions of the computing apparatus 100 may be implemented using pre-programmed hardware or firmware elements (e.g., application specific integrated circuits (ASICs), electrically erasable programmable read-only memories (EEPROMs), etc.), or other related components. In other embodiments, portions of computing apparatus 100 may be implemented as an arithmetic and logic unit (ALU) having access to a code memory (not shown) which stores program instructions for the operation of the ALU. The program instructions could be stored on a medium which is fixed, tangible and readable directly by the aforementioned portions of the computing apparatus 100 (e.g., via removable diskette, CD-ROM, ROM, fixed disk, USB drive), or the program instructions could be stored remotely but transmittable to the aforementioned certain portions of the address server and the computing apparatus via a modem or other interface device.

When the computing apparatus 100 is embodied as a desktop or laptop computer, the network interface 102 may take the form of a PC network card that may implement a TCP/IP (Transmission Control Protocol/Internet Protocol) stack among other functionality. The computing apparatus 100 further comprises a plurality of functional entities connected to the network interface 102. In the embodiment of FIG. 1, the functional entities include a soft client 106 and an Internet browser 108. It will occur to those skilled in the art that the two functional entities 106, 108 (as well as other functional entities not illustrated) may be implemented as different software applications running on one or more processors and sharing one or more memory areas.

The computing apparatus 100 further comprises an input/output interface 110 connected to the Internet browser 108 and to the soft client 106. The input/output interface 110 provides an interface to a variety of peripheral communications devices, such as a display 112, a keyboard 114 and a mouse 116, as well as a speaker 117 and a microphone 119 (which can be separate components, combined into a headset, or integrated to the computing apparatus 100).

The access network 104 is connected to a backbone network 120, which is connected to another access network 122. The access network 104 represents a network that is local to the computing apparatus 100 and which may, but typically does not, traverse the Internet. Thus, for example, the access network 104 may be an intranet or a home network, although it should be appreciated by those skilled in the art that other configurations are possible. The access network 104 may comprise an arrangement of network elements, including an address server 124.

The address server 124 is responsible for receiving and responding to requests for IP addresses. Such requests are received from the network interface 102 of the computing apparatus 100. For example, the network interface 102 may release a request for an IP address when the computing apparatus 100 is turned on and/or when the soft client 106 is instantiated and/or when the Internet browser 108 is instantiated. Further discussion of the manner in which requests for IP addresses are released by the network interface 102 and responded to by the address server 124 is provided later on.

Generally speaking, the address server 124 may be any address-assigning entity capable of assigning addresses upon request. In one non-limiting example, the address server 124 may be embodied as a Dynamic Host Configuration Protocol (DHCP) server. It should be understood that in other non-limiting embodiments, the address server 124 may be integrated with the computing apparatus 100, which is expected to be the case in home networks where the access network 104 may simply comprise a modem connected to a single computing apparatus acting both as an address server and as an end device.

The access network 104 is connected to the backbone network 120 via one or more routers. In this specific case, two routers 126, 128 are shown, but it should be appreciated that the number of routers between the access network 104 and the backbone network 120 is not particularly limited. The routers 126, 128, which are connected to each other and to other elements of the access network 104, execute conventional routing functionality based on IP addresses. Specifically, a packet that arrives at a router 126, 128 will have a header specifying a destination IP address associated with the packet. The router 126, 128 examines the header and, on the basis of the destination IP address found therein, forwards the packet towards an appropriate neighbouring network element, either in the access network 104 or in the backbone network 120. In addition, where the IP addresses used within the access network 104 are not visible from the backbone network 120, the routers 126, 128 may execute network address translation (NAT) or a proxy function, as would be known to persons of skill in the art.

The backbone network 120 is, in turn, connected to the access network 122 by one or more routers. In this specific case, two routers 130, 132 are shown, but it should be appreciated that the number of routers between the backbone network 120 and the access network 122 is not particularly limited. The routers 130, 132, which are connected to each other and to other elements of the access network 122, execute conventional routing functionality based on IP addresses. Specifically, a packet that arrives at a router 130, 132 will have a header specifying a destination IP address associated with the packet. The router 130, 132 examines the header and, on the basis of the destination IP address found therein, forwards the packet towards an appropriate neighbouring network element, either in the backbone network 120 or in the access network 122. Here again, where the IP addresses used within the access network 122 are not visible from the backbone network 120, the routers 130, 132 may execute network address translation (NAT) or a proxy function, as appropriate.

In specific non-limiting example embodiments, the access network 122 may be implemented as an intranet or a LAN, which connects a variety of network elements to one another. In the illustrated embodiment, the network elements connected to the access network 122 include a web server 134 and a VoIP phone 136. In a variant, the web server 134 may be connected directly to the backbone network 120.

As mentioned above, the routers 126, 128, 130, 132 perform routing of a received IP packet in a conventional manner, according to the destination address of the received IP packet. This is achieved by consulting a forwarding database 146, 148, 150, 152 at each router 126, 128, 130, 132. The forwarding database 146, 148, 150, 152 codifies where to forward packets having specific destination IP addresses. Furthermore, communication protocols exist (e.g., IGP, EGP, MPLS, to name a few) which allow the forwarding databases 146, 148, 150, 152 to be configured for specific IP addresses or subnets (i.e., larger groups of IP addresses) by propagating specific instructions to several or all routers, including routers 126, 128, 130, 132 (as well as other routers, not shown) in the backbone network 120.

Now, according to the above-described process by which routing is performed, it will become apparent that one can derive a set of "specific routing requirements" for one or more IP addresses in order to control the manner in which packets destined for any those IP addresses will be routed by the backbone network 120. Such control is useful when one wishes to apply different routing rules to packets in respective so-called "differentiated traffic categories", where each differentiated traffic category may represent a type of data that is handled by a corresponding one of the functional elements 106, 108 in the computing apparatus 100. Non-limiting examples of a differentiated traffic category that may arise in a given application of the present invention include "VoIP traffic", "secure VoIP traffic", "secure data traffic", "non-secure data traffic", "gaming traffic", and so on.

Moreover, by reserving a particular collection of IP addresses for the purposes of routing traffic belonging to a particular differentiated traffic category, one can effectively derive specific routing requirements for that differentiated traffic category beforehand. This is achieved by propagating, ahead of time, the specific routing requirements associated with the particular differentiated traffic category, along with the IP addresses in the collection of IP addresses, to the various routers in the backbone network 120. The details of this procedure will be provided in further detail herein below.

Before proceeding, however, it may be useful to mention several non-limiting examples of specific routing requirements that may be associated with a particular differentiated traffic category. These include an explicit route through the backbone network 120 (whereby the precise hop-by-hop route through part or all of the backbone network 120 is pre-selected), a priority designation, a QoS characteristic, a security rule, a requirement to pass through a particular device, etc. It should be noted that the specific routing requirements associated with a particular differentiated traffic category may convey a preferential treatment of packets in that traffic category, whereas in other cases the opposite may be true, e.g., the specific routing requirements may convey a lower priority or a reduced security requirement.

Turning now to a specific non-limiting example, assume that there is a single differentiated traffic category of interest, namely VoIP traffic. It is recalled that VoIP traffic is exchanged in both directions between the soft client 106 in the computing device 100 and the VoIP phone 136. Also, assume that for reasons related to security, bandwidth, priority, SLA requirements or otherwise, the specific routing requirements associated with VoIP traffic specify that packets are to be routed with the highest possible priority.

As far as traffic destined for the VoIP phone 136 is concerned, one can ensure that packets will be routed in accordance with the aforementioned specific routing requirements (namely, "highest possible priority") by propagating, ahead of time, these specific routing requirements, along with the IP address of the VoIP phone 136. It should be appreciated that the IP address of the VoIP phone 136 is available at a relatively early stage, i.e., as soon as the VoIP phone 136 is connected to the access network 122.

In particular, the requisite information is propagated to the forwarding databases 146, 148, 150, 152 in the various routers 126, 128, 130, 132 at the edges of the backbone network 120, as well as to the forwarding databases in other routers (not shown) within the backbone network 120 itself Various protocols may be used for this purpose, such as ICP and CGP, to name a few. As a result, the forwarding databases 146, 148, 150, 152 in the various routers 126, 128, 130, 132 at the edges of the backbone network 120, as well as the forwarding databases in the routers within the backbone network 120 itself, will be configured with the necessary information to eventually route packets towards the VoIP phone 136 with the highest possible priority.

Figure 2A:
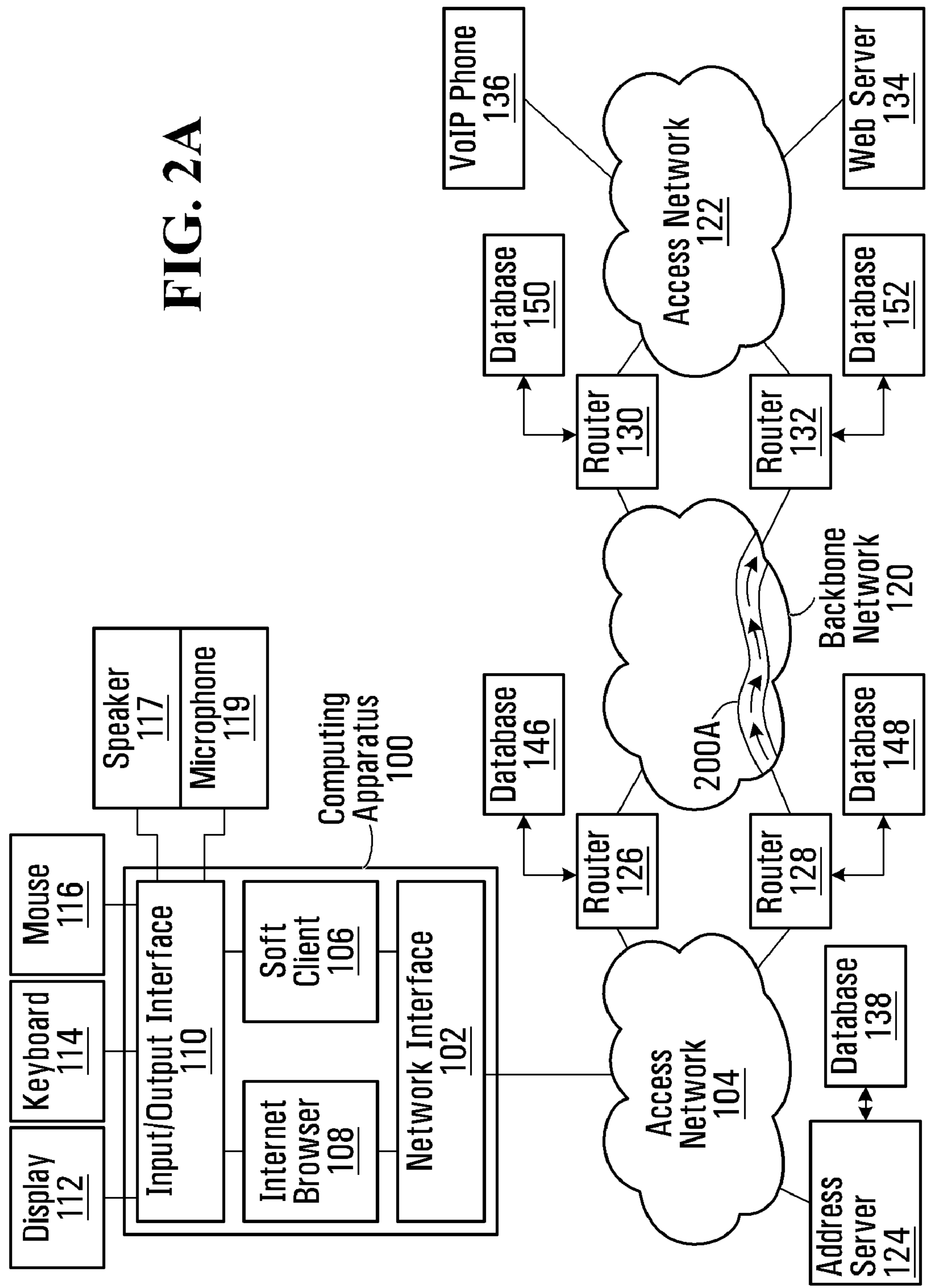
FIG. 2A illustrates a hypothetical path through a backbone network, in a direction of communication from the computing apparatus.

With reference to FIG. 2A, there is shown a hypothetical path 200A that would be taken by packets destined for the VoIP phone 136 through the backbone network 120 in accordance with the specific routing requirements mentioned above. Stated differently, the path 200A represents the route that would be taken by packets destined for the VoIP phone 136 if they entered the backbone network 120 from the access network 104. In this specific case, packets travelling from the access network 104 to the VoIP phone 136 would enter the backbone network 120 at router 128 and would exit the backbone network 120 at router 132. The route taken within the backbone 120 is of course dependent on prevailing network conditions.

Now, concerning VoIP traffic destined for the soft client 106, the approach taken is slightly different. Specifically, the soft client 106 does not necessarily have a single, pre-determined IP address. In fact, the soft client 106 may not even be associated with any IP address until it is instantiated by the computing apparatus 100. To obtain an IP address for the soft client 106, it is within the scope of the present invention to request an IP address when one is needed.

The process of requesting and obtaining an IP address for the soft client 106 will be described later on in greater detail. For now, suffice it to say that the IP address for the soft client 106 will be assigned by the address server 124 from a subnet created for VoIP traffic, hereinafter referred to as a VoIP subnet. The VoIP subnet contains one or more available (but as yet unassigned) IP addresses, which may be contiguous. An association between the VoIP subnet and the fact that it pertains to VoIP traffic can be stored in the address server 124, such as in the form of a database 138. With reference to FIG. 2B, there is shown the VoIP subnet that has been created for VoIP traffic. Specifically, the VoIP subnet is denoted as 192.168.12.0/23, covering IP addresses between 192.168.12.0 and 192.168.13.255 according to classless inter-domain routing (CIDR) notation.

Figure 2C:
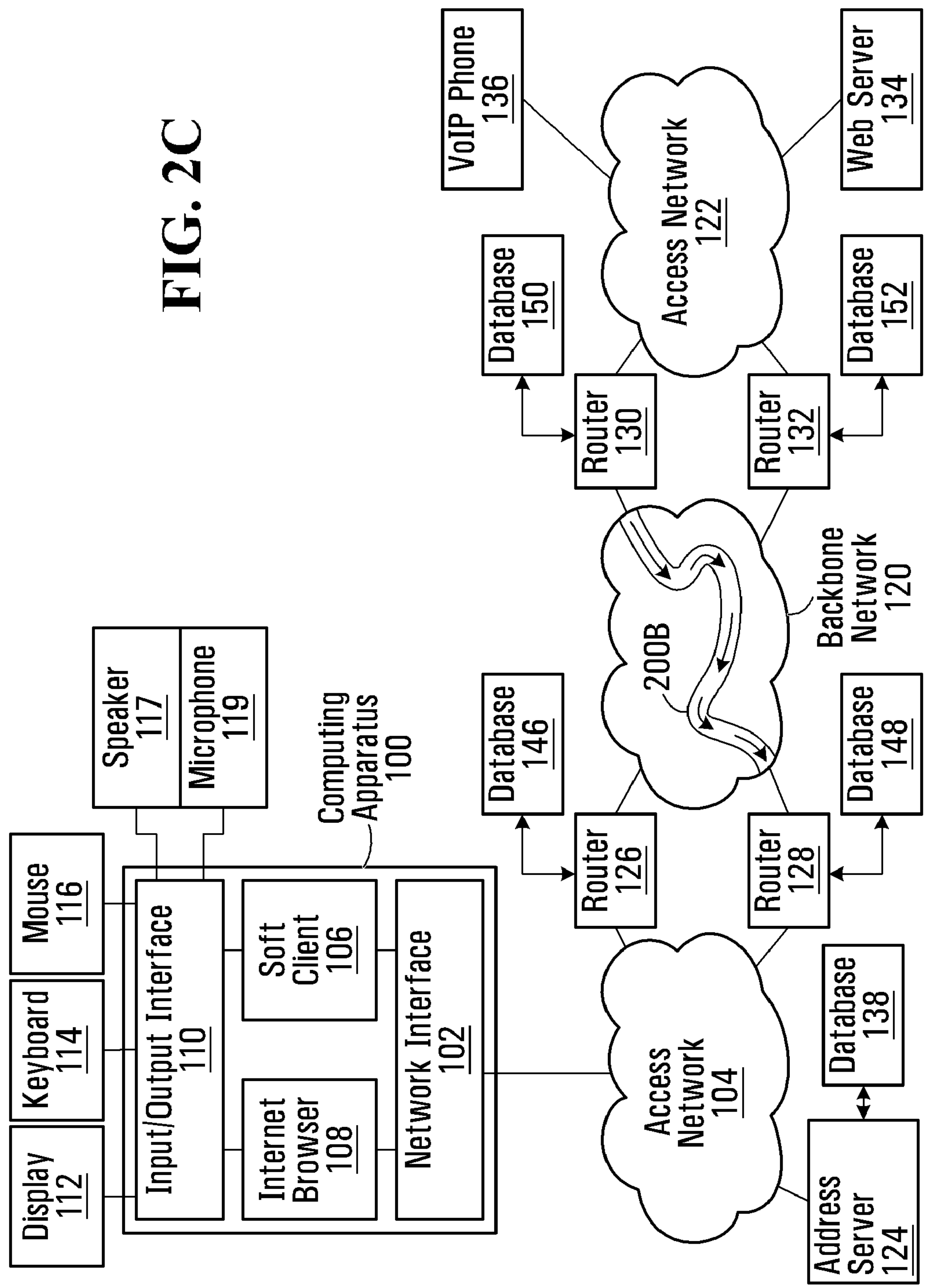
FIG. 2C illustrates a hypothetical path through the backbone network, in a direction of communication towards the computing apparatus.

The specific routing requirements for VoIP traffic, as well as the identity of the VoIP subnet, are propagated to the forwarding databases 146, 148, 150, 152 in the various routers 126, 128, 130, 132 at the edges of the backbone network 120, as well as to the forwarding databases in other routers within the backbone network 120 itself Various protocols may be used for this purpose, such as ICP and CGP, to name a few. As a result, the forwarding databases 146, 148, 150, 152 in the various routers 126, 128, 130, 132 at the edges of the backbone network 120, as well as the forwarding databases for routers within the backbone network 120 itself, will be configured with the necessary information to eventually route packets towards the members of the VoIP subnet 192.168.12.0/23 with the highest possible priority With reference now to FIG. 2C, there is shown a hypothetical path 200B that would be taken by packets destined for any member of the VoIP subnet 192.168.12.0/23 through the backbone network 120 in accordance with the specific routing requirements mentioned above. Stated differently, the path 200B represents the route that would be taken by packets destined for any member of the VoIP subnet 192.168.12.0/23 if they entered the backbone network 120 from the access network 122. In this specific case, packets travelling from the access network 122 towards any member of the VoIP subnet 192.168.12.0/23 would enter the backbone network 120 at router 130 and would exit the backbone network 120 at router 128. The route taken within the backbone 120 is of course dependent on prevailing network conditions.

Having prepared the routers 126, 128, 130, 132 for routing packets in a given differentiated traffic category (such as VoIP traffic) in both directions of communication, and particularly towards the computing apparatus 100, the process of requesting and obtaining an IP address for the soft client 106 is now described. Obtaining an IP address for the soft client 106 may be desired in order to allow the soft client 106 to participate in a bidirectional VoIP "session" with the VoIP phone 136, for example. A "session" can be envisioned as an end-to-end connection that carries traffic of some kind.

Firstly, it is recalled that the address server 124 comprises the database 138, which maintains an association between the VoIP subnet 192.168.12.0/23 and the fact that it pertains to VoIP traffic. Therefore, if the address server 124 were to receive a request from the computing apparatus 100 to issue an IP address, and if the address server 124 could determine that the request pertains to VoIP traffic, then it would be desirable for the address server to respond to such a request (hereinafter referred to as a "VoIP address request") by returning an IP address from the VoIP subnet 192.168.12.0/23 (assuming that one is available). Likewise, if the address server 124 could determine that the request does not pertain to VoIP traffic, then it would be desirable for the address server to respond to this request (hereinafter referred to as a "non-VoIP address request") by returning an IP address that is not in the VoIP subnet 192.168.12.0/23. Since both requests come from the same computing apparatus 100, the address server 124 needs to be able to distinguish between a VoIP address request and a non-VoIP address request.

Accordingly, an embodiment of the present invention provides that certain address requests issued by the computing apparatus 100 will comprise data instrumental in causing the address server 124 to issue an IP address in a desired subnet. Specifically, VoIP address requests issued by the computing apparatus 100 may be configured so as to comprise data instrumental in causing the address server 124 to issue an IP address in the VoIP subnet 192.168.12.0/23. In a specific example where the address server 124 is a DHCP server, one may utilize various possible non-limiting DHCP options in order to formulate address requests having the suitable data. These include, without limitation, RFC 1497 Vendor Extension, IP Layer Parameters per Host, Vendor Specific Information, Requested IP Address, Client-Identifier, to name a few.

Figure 3:
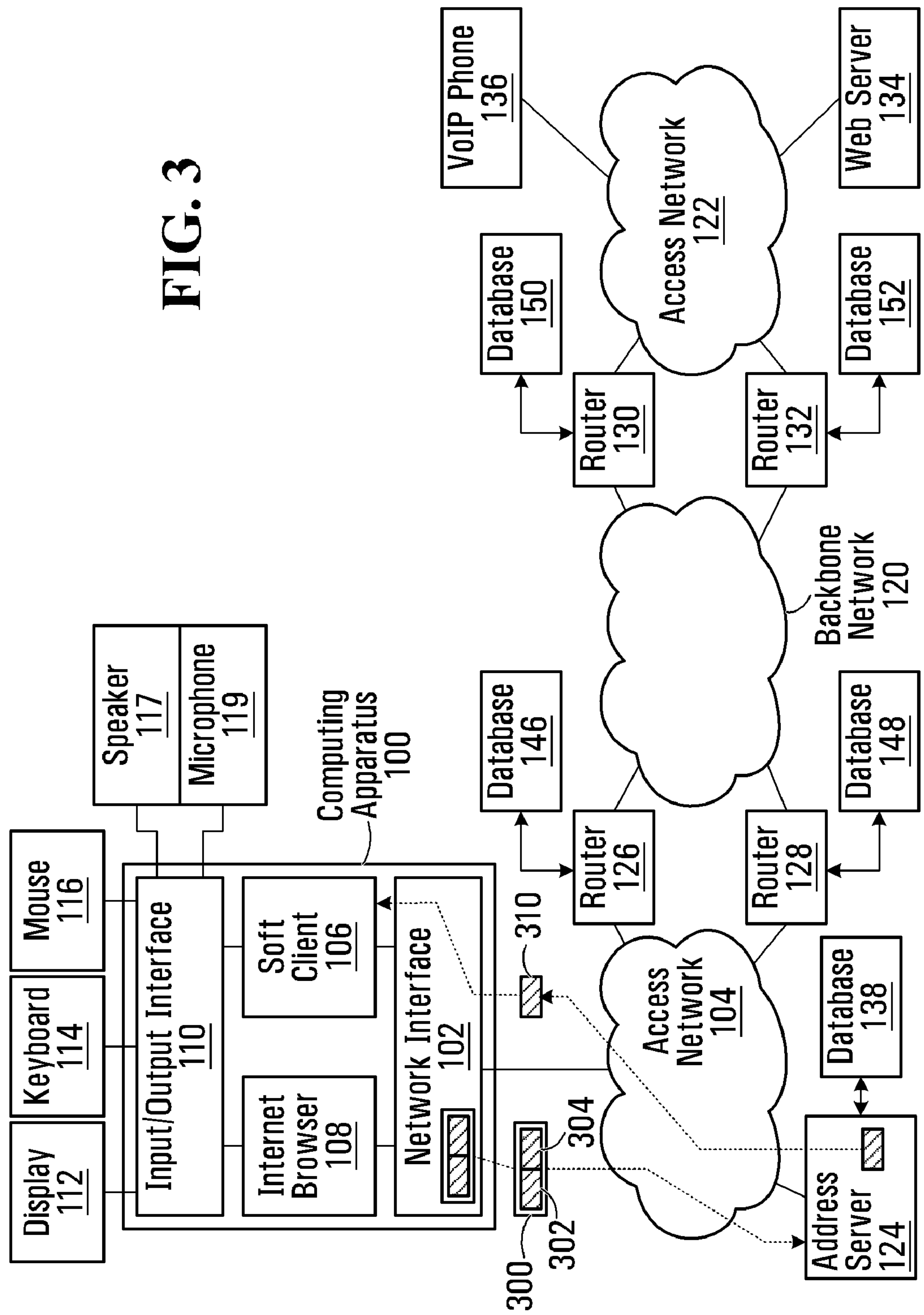
FIG. 3 is a flow diagram showing how the computing apparatus requests and obtains a network address that enables the computing apparatus to act as a receptor of traffic in a first traffic category.

For example, and as shown in FIG. 3, a VoIP address request 300 received by the address server 124 may comprise an original address request 302 accompanied by an indicator 304. The indicator 304 is instrumental in causing the address server 124 to select an IP address from the VoIP subnet 192.168.12.0/23. To this end, the indicator 304 may take the form of a virtual address (e.g., a virtual MAC address) of the soft client 106 or it may be a code understood by the address server 124 to mean "VoIP traffic".

In a first specific embodiment, the soft client 106 itself generates the entire VoIP address request 300, which is received and then simply released by the network interface 102 in its original form towards the address server 124.

In a second specific embodiment (not shown), the soft client 106 issues the original address request 302 (i.e., without the indicator 304), which is recognized by the network interface 102 as having been generated by the soft client 106. In response, the network interface 102 generates the indicator 304 and appends it to the soft client's original address request 302, thereby resulting in a VoIP address request resembling the previously described VoIP address request 300, and which is released towards the address server 124.

In a third specific embodiment (not shown), the soft client 106 issues the original address request 302 (i.e., without the indicator 304), which is intercepted by an intermediate software element (potentially residing at the operating system level). The intermediate software element determines that the original address request 302 was generated by the soft client 106. In response, the intermediate software element generates the indicator 304 and appends it to the soft client's original address request 302 (or creates a new address request to which is appended the indicator 304), thereby resulting in a VoIP address request resembling the previously described VoIP address request 300, which is received and then released by the network interface 102 towards the address server 124.

In a fourth specific embodiment (not shown), the soft client 106 issues an address request containing a MAC address of the computing apparatus 100, which is intercepted by an intermediate software element (potentially residing at the operating system level). The intermediate software element determines that the address request was generated by the soft client 106. In response, the intermediate software element changes the MAC address such that it identifies a virtual MAC address known to the address server 124. The modified version of the address request, which takes the form of the above-described VoIP address request 300, is then sent by the intermediate software element to the network interface 102, which then releases the address request towards the address server 124.

Once the VoIP address request 300 reaches the address server 124 using one of the above approaches, the following method can be performed. Firstly, the address server 124 attempts to determine whether the received address request is associated with a differentiated traffic category. In this specific example, the address server 124 determines that the received VoIP address request 300 is associated with VoIP traffic. This determination can be made by processing the indicator 304, which, it is recalled, may specify a virtual address or a code, for example.

Next, the address server 124 consults the database 138 in an attempt to identify a subnet corresponding to the determined traffic category. In this specific example, the address server identifies the VoIP subnet 192.168.12.0/23 as corresponding to VoIP traffic. The address server 124 then proceeds to select an available IP address 310 that is a member of the corresponding subnet (in this specific example, the VoIP subnet 192.168.12.0/23), and returns the selected IP address 310 to the requesting party (in this specific example, the soft client 106), via the network interface 102. The requesting party (in this specific example, the soft client 106) then binds to the received IP address 310, which means that the soft client 106 will begin to act as a receptor of packets destined for the assigned IP address 310. At the address server 124, the selected IP address 310 is deemed "assigned" and is therefore no longer considered available.

In addition to obtaining an IP address for the soft client 106, it may also be desired to obtain an IP address for the Internet browser 108 in order to allow it to participate in a "data session" with the web server 134. The process of requesting and obtaining an IP address for the Internet browser 108 is somewhat different, and is now described. Specifically, it is noted that in the above non-limiting example, there was a single differentiated traffic category of interest, namely VoIP traffic. Thus, in the current non-limiting example, the traffic exchanged in both directions between the Internet browser 108 and the web server 134, which is non-VoIP traffic, will not be associated with any specific routing requirements.

Figure 4:
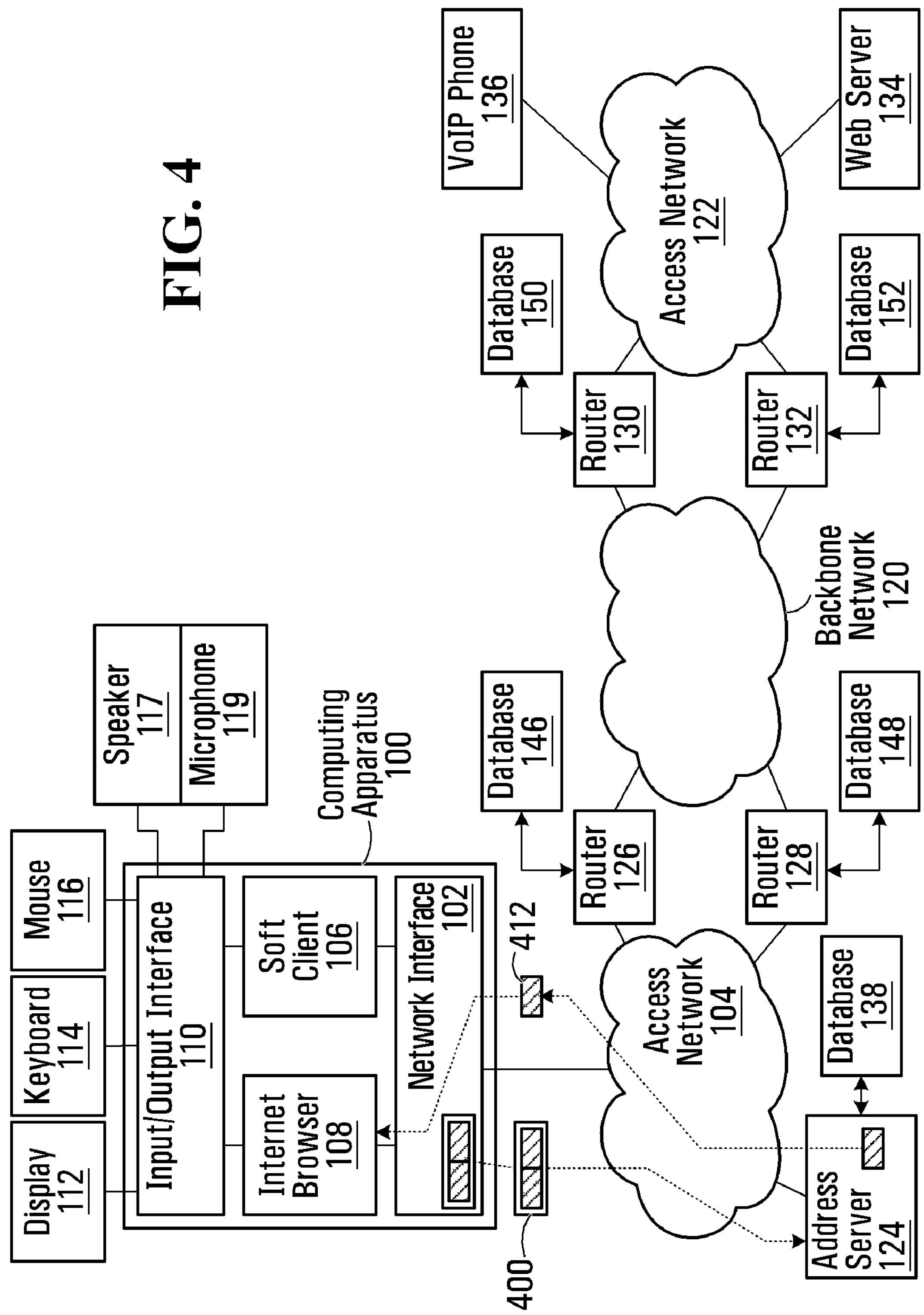
FIG. 4 is a flow diagram showing how the computing apparatus requests and obtains a network address that enables the computing apparatus to act as a receptor of traffic in a second traffic category.

With this in mind, FIG. 4 shows receipt of an address request 400 by the address server 124. The address request 400 may be issued by the Internet browser 108 or by the network interface 102 on behalf of the Internet browser 108. For example, the address request 400 may be generically associated with the computing apparatus 100 and thus may be generated by the network interface 102 when the computing apparatus 100 becomes aware of its connection to the access network 104. In other cases, the address request 400 may be generated by the Internet browser 108 when the latter is instantiated, in which case the address request 400 is received by the network interface 102 and then released towards the address server 124.

Since in this specific example the address request 400 is not associated with any particular differentiated traffic category, the address request 400 may be free from an indicator analogous to the indicator 304 that accompanied the previously described VoIP address request 300.

In response to receipt of the address request 400, the address server 124 selects an IP address 412 that is not in the VoIP subnet 192.168.12.0/23. The selected IP address 412 is deemed "assigned" and is therefore no longer considered available. The address server 124 returns the assigned IP address 412 to the requesting party, i.e., the Internet browser 108 or the network interface 102. If the requesting party is the Internet browser 108, then the Internet browser 108 binds to the assigned IP address 412, which means that the Internet browser 108 will act as a receptor of web traffic whose packets carry the assigned IP address 412. If the requesting party is the network interface 102 acting on behalf of the Internet browser 108, then the network interface 102 binds to the assigned IP address 412, which means that the network interface 102 will act as a receptor of traffic destined for the assigned IP address 412. If the traffic needs to be forwarded to the Internet browser 108, then this is handled by the network interface 102 using a protocol internal to the computing apparatus 100.

As a result of binding to the assigned IP address 310, the soft client 106 may now participate in a VoIP session with the VoIP phone 136, while as a result of binding to the assigned IP address 412, the Internet browser 108 may now participate in a data session with the web server 134.

Figure 5:
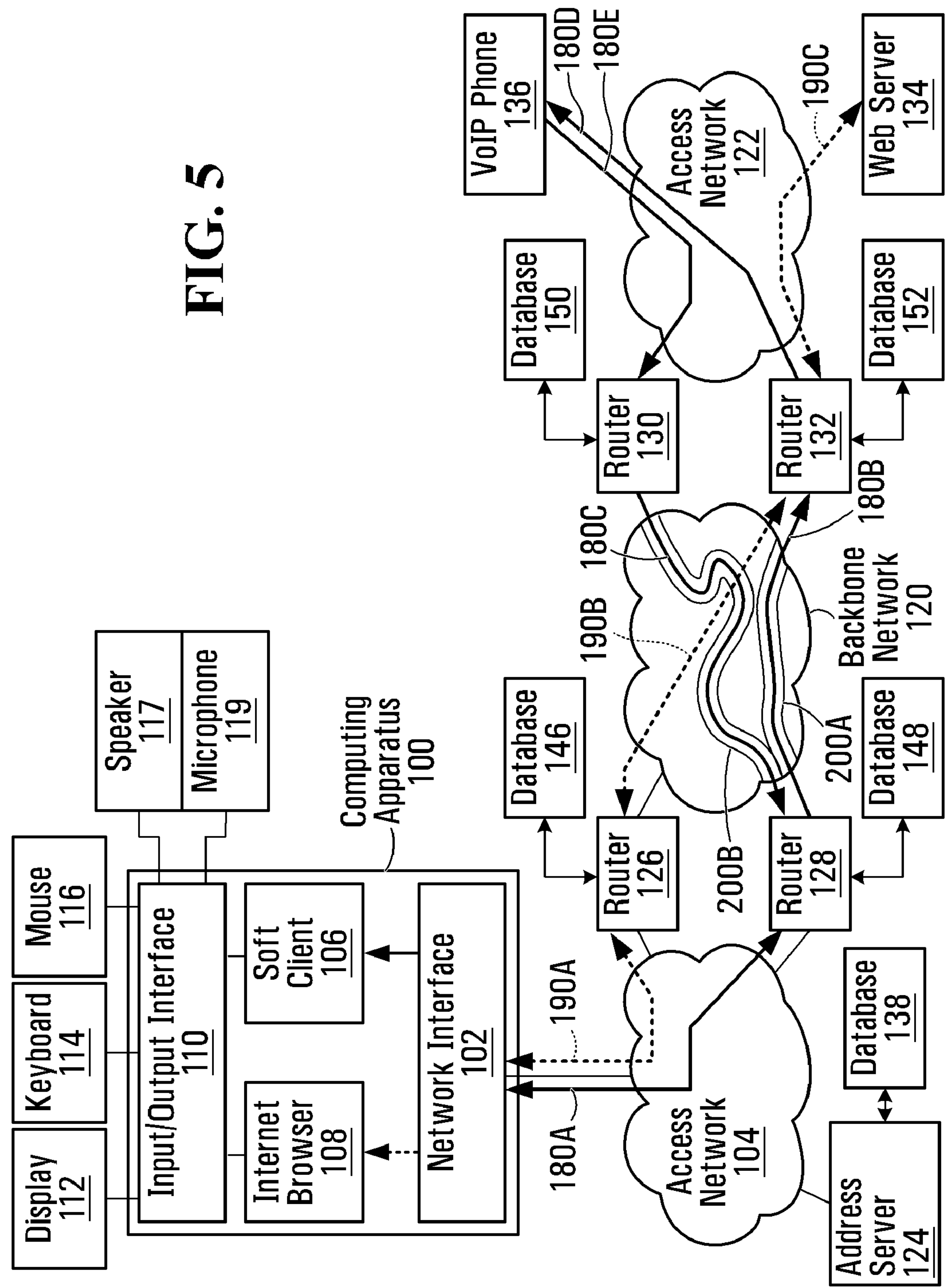
FIG. 5 depicts the paths traveled by traffic in the first and second traffic categories.

With reference to FIG. 5, the VoIP session is denoted by the numeral 180. The VoIP session 180 comprises a first portion 180A that carries VoIP traffic in both directions between the soft client 106 and the backbone network 120 (specifically, the router 128), a second portion 180B that carries VoIP traffic from router 128 to router 132 along the path 200A through the backbone network 120, a third portion 180C that carries VoIP traffic from router 130 to router 128 along the path 200B through the backbone network 120, a fourth portion 180D that carries VoIP traffic from router 132 to the VoIP phone 136 through the access network 122, and a fifth portion 180E that carries traffic from the VoIP phone 136 to router 130 through the access network 122. It should be understood that in some embodiments, certain ones of the portions of the VoIP session 180 that have been shown as unidirectional may be bidirectional and certain other ones of the portions of the VoIP session 180 that have been shown as bidirectional may be unidirectional. For example, the path 200A through the backbone network 120 may support bidirectional VoIP traffic for the VoIP session 180 and thus may combine portions 180B and 180C.

In addition, with continued reference to FIG. 5, the "data session" is denoted by the numeral 190. The data session 190 comprises a first portion 190A that carries non-VoIP traffic in both directions between the Internet browser 108 and the backbone network 120 (specifically, the router 126), a second portion 190B that carries non-VoIP traffic in both directions through the backbone network 120, and a third portion 190C that carries non-VoIP traffic in both directions between the backbone network 120 (specifically, the router 132) and the web server 134. Although each portion of the data session 190 has been shown as bidirectional, one should appreciate that each bidirectional portion 190A, 190B, 190C may actually consist of two unidirectional portions.

Of note is the fact that even though both the VoIP session 180 and the data session 190 terminate at the same computing apparatus 100, the specific routing requirements associated with VoIP traffic cause the packets in the VoIP session 180 to be routed differently from the packets in the data session 190. As a result, since the permissible delay for one type of traffic may be different from the permissible delay for another type of traffic, the above-described embodiment allows an optimized apportioning of delay. Moreover, if a virus affects one of the functional entities 106, 108 (and possibly prevents it from operating temporarily), this will not affect the session(s) being run by the other, hence resulting in increased network robustness and security.

For the purposes of the above example, it was assumed that all traffic exchanged by the functional entities of the computing apparatus 100 terminates at either the web server 134 or the VoIP phone 136. However, those skilled in the art will appreciate that the illustrated number of communications sessions and the illustrated location at which they terminate are not to be considered as limiting in any respect. In particular, it should be recognized that a variety of devices other than the web server 134 and the VoIP phone 136 may be capable of terminating a communication session with the computing apparatus 100. Examples of other "terminating devices" include another soft client, an FTP server, an electronic mail server, a file server, a voice gateway, a gaming server and a video content source (e.g., an IPTV content source), to name a few. Moreover, the terminating devices need not all be connected to the same access network 122. In fact, it is possible for individual terminating devices to be connected to their own access networks, which would be connected to the access network 104 via the backbone network 120. Thus, the fact that both communications sessions 180, 190 are seen as terminating at devices connected to the same access network 122 should be viewed as merely illustrative, in order to allow the discussion of the network architecture to be simplified.

Also, in the above description, despite the ability of the computing apparatus to support traffic in multiple traffic categories (namely, VoIP traffic and non-VOIP traffic), only the VoIP traffic was considered to be a differentiated traffic category and thus associated with specific routing requirements through the backbone network 120. Generally speaking, however, when the computing apparatus 100 supports more than one differentiated traffic category, each of these differentiated traffic categories can be associated with its own specific routing requirements through the backbone network 120. Thus, it is within the scope of the present invention for the address server 124 to maintain not just one but multiple sets of at least one address per set, each such set corresponding to a different traffic category. This would have the effect of creating multiple paths through the backbone network 120 towards the computing apparatus 100, each such path being analogous to the path 200B that was created for routing VoIP traffic to the soft client 106.

Figure 6:
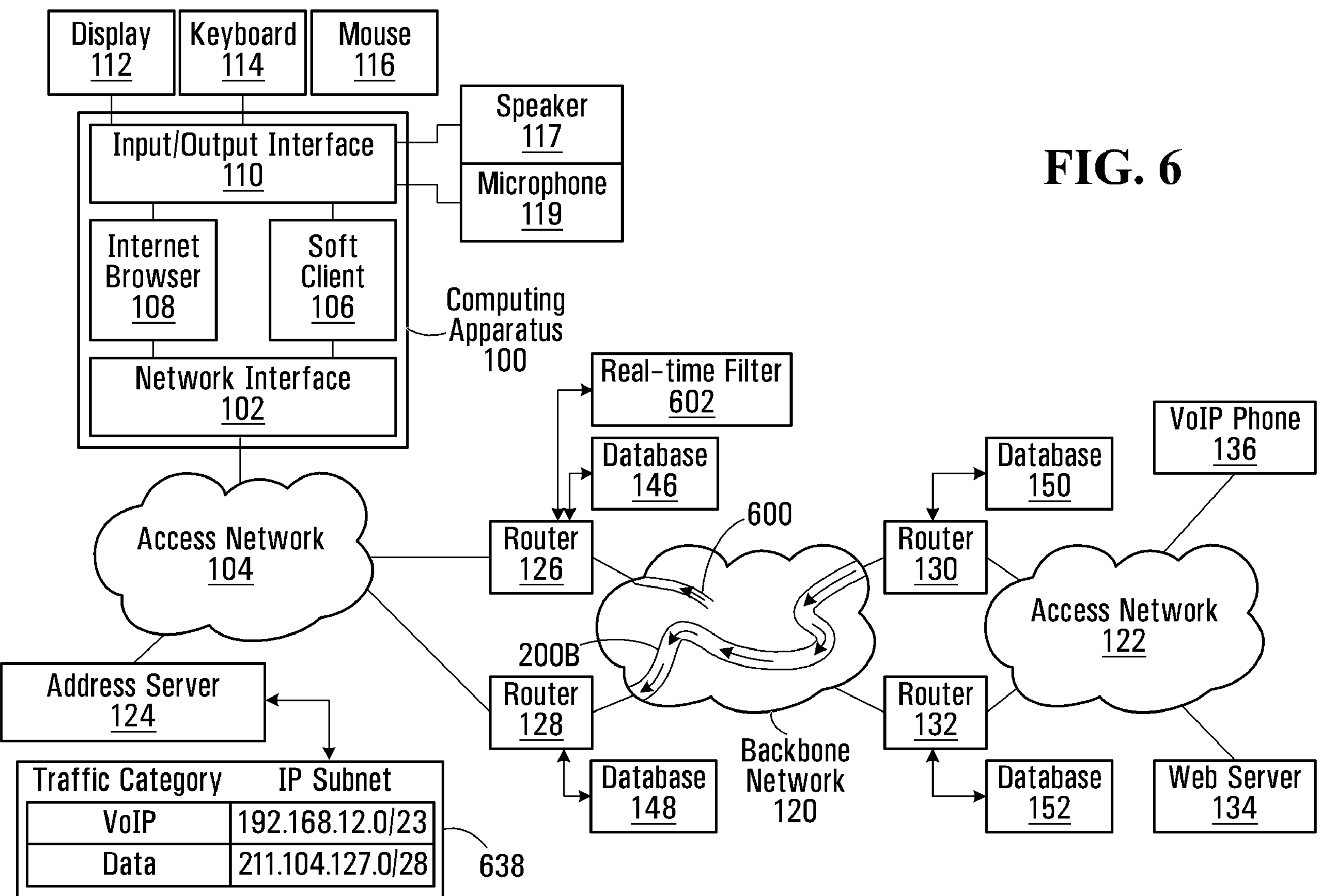
FIGS. 6-9 are block diagrams of a network architecture in accordance with various alternative embodiments of the present invention.

For instance, it should be appreciated that non-VoIP traffic may in fact be associated with its own specific routing requirements (different from those for VoIP traffic). In this case, as shown in FIG. 6, a database 638 accessible to the address server 124 additionally maintains an association between non-VoIP traffic and a second subnet containing one or more assignable IP addresses. Specifically, the database 638 associates packets destined for the soft client 106 with the previously defined VoIP subnet 192.168.12.0/23 and also associates packets destined for the Internet browser 108 with a non-VoIP subnet 211.104.127.0/28, which covers IP addresses between 211.104.127.0 and 211.104.127.15.

Each of VoIP traffic and non-VoIP traffic is associated with their own specific routing requirements. The specific routing requirements associated with packets destined for any IP address in the VoIP subnet may be "highest possible priorty", as before. On the other hand, the specific routing requirements associated with traffic destined for any IP address in the non-VoIP subnet may call for packet redirection to a real-time filter 602 connected to router 126.

Thus, the previously described path 200B continues to apply to VoIP traffic (i.e., packets having an assigned IP address in the VoIP subnet) and leads to router 128, while a path—shown in part as 600—that applies to non-VoIP traffic (i.e., packets having an assigned IP address in the non-VoIP subnet) leads to router 126, in this specific example.

In order to take full advantage of the specific routing requirements associated with both VoIP traffic and non-VoIP traffic, the address requests issued by (or on behalf of) either the soft client 106 or the Internet browser 108 should each include an indicator instrumental in causing the address server 124 to assign an IP address from the appropriate subnet.

The above-described concepts can also be applied to cases where it is desired to provide differentiated routing for packets that may belong to one of more than two possible differentiated traffic categories being handled by respective functional entities running on the same computing apparatus.

Figure 7:
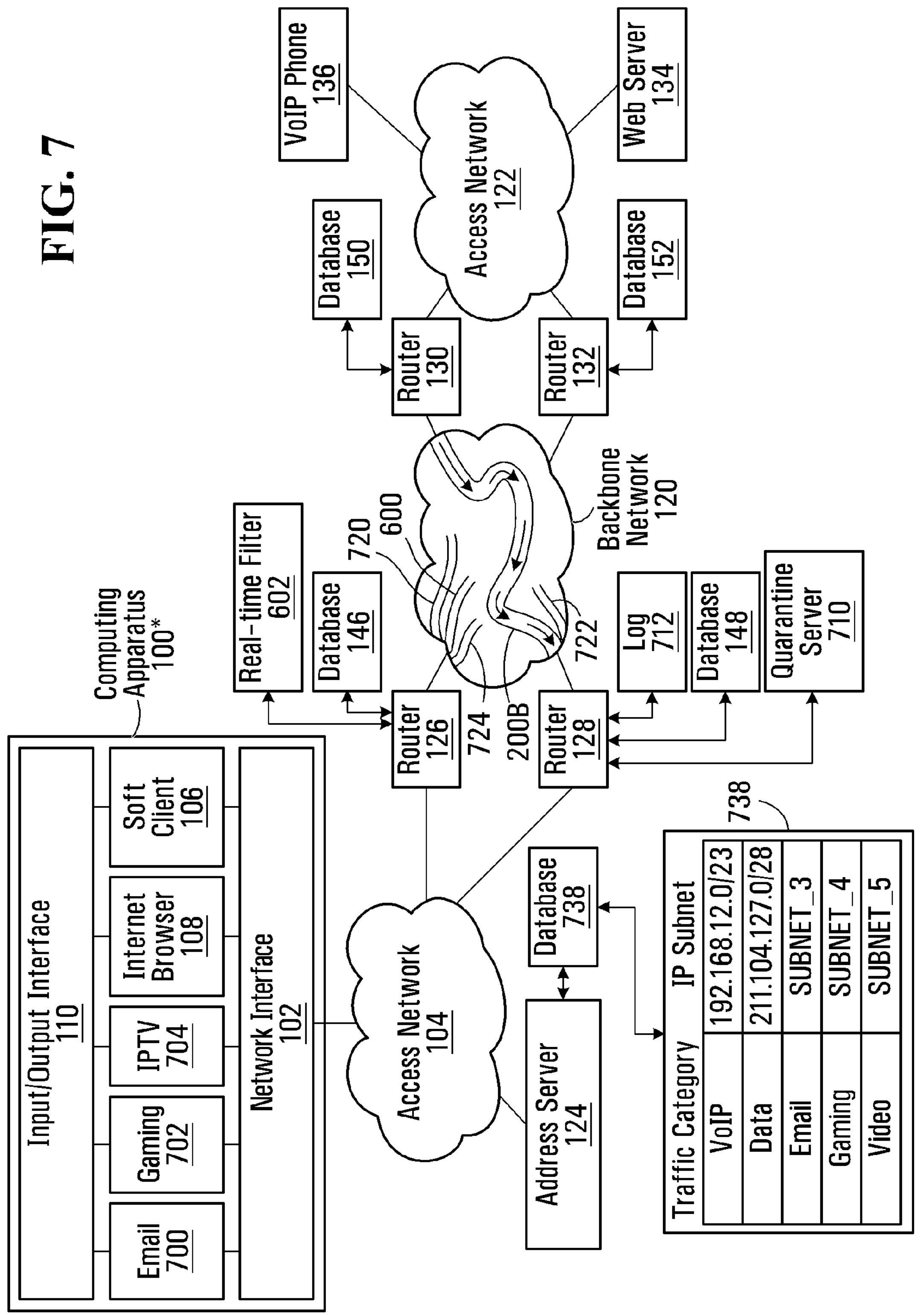

For example, as shown in FIG. 7, the computing apparatus 100* may run various functional entities in addition to the Internet browser 108 and the soft client 106, such as an electronic mail (email) application 700 (e.g., Microsoft Outlook™), a gaming application 702 and a video application 704 (e.g., an IPTV application), to name a few non-limiting examples. Each of the functional entities 106, 108, 700, 702, 704 may handle traffic in a corresponding differentiated traffic category. The address server 124 creates and/or maintains a subnet for each of the differentiated traffic categories and the association between each differentiated traffic category and a corresponding subnet for that differentiated traffic category is maintained in a database 738.

Specifically, in addition to associating VoIP traffic with the previously defined VoIP subnet 192.168.12.0/23 and "data traffic" with the previously defined subnet 211.104.127.0/28 (now referred to as a "data subnet"), the database 738 associates traffic destined for the email application 700 with an email subnet SUBNET_3, traffic destined for the gaming application 702 with a gaming subnet SUBNET_4 and traffic destined for the video application 704 with a video subnet SUBNET_5.

Moreover, in this example, data traffic, email traffic, gaming traffic and video traffic are each associated with their own specific routing requirements, in addition to those previously described for VoIP traffic. For example, the specific routing requirements associated with traffic destined for any IP address in the data subnet may call for packet redirection to the aforementioned real-time filter 602 connected to router 126. In addition, the specific routing requirements for traffic destined for any IP address in the email subnet SUBNET_3 may call for packet redirection to a quarantine server 710 connected to router 128. Also, the specific routing requirements for traffic destined for any IP address in the gaming subnet SUBNET_4 may call for packet redirection to a log server 712 connected to router 128. Finally, the specific routing requirements for traffic destined for any IP address in the video subnet SUBNET_5 may be "lowest priority".

Thus, the previously described path 200B continues to apply to VoIP traffic (i.e., packets having an assigned IP address in the VoIP subnet), while the previously defined path—shown in part as 600—which used to apply to non-VoIP traffic now applies to data traffic (i.e., packets having an assigned IP address in the data subnet). In addition, a new path—shown in part as 720—applies to email traffic (i.e., packets having an assigned IP address in the email subnet), another new path—shown in part as 722—applies to gaming traffic (i.e., packets having an assigned IP address in the gaming subnet) and yet another new path—shown in part as 724—applies to video traffic (i.e., packets having an assigned IP address in the video subnet).

In order to take full advantage of the specific routing requirements associated with traffic in the various aforementioned traffic categories, the address requests issued by (or on behalf of) the soft client 106, the Internet browser 108, the email application 700, the gaming application 702 and the video application 704 should each include an indicator instrumental in causing the address server 124 to assign an IP address from the appropriate subnet.

The above-described concepts can also be applied to cases where it is desired to provide differentiated routing for packets that may belong to one of a plurality of differentiated traffic categories being handled by common functional entities running on a computing apparatus.

Figure 8:
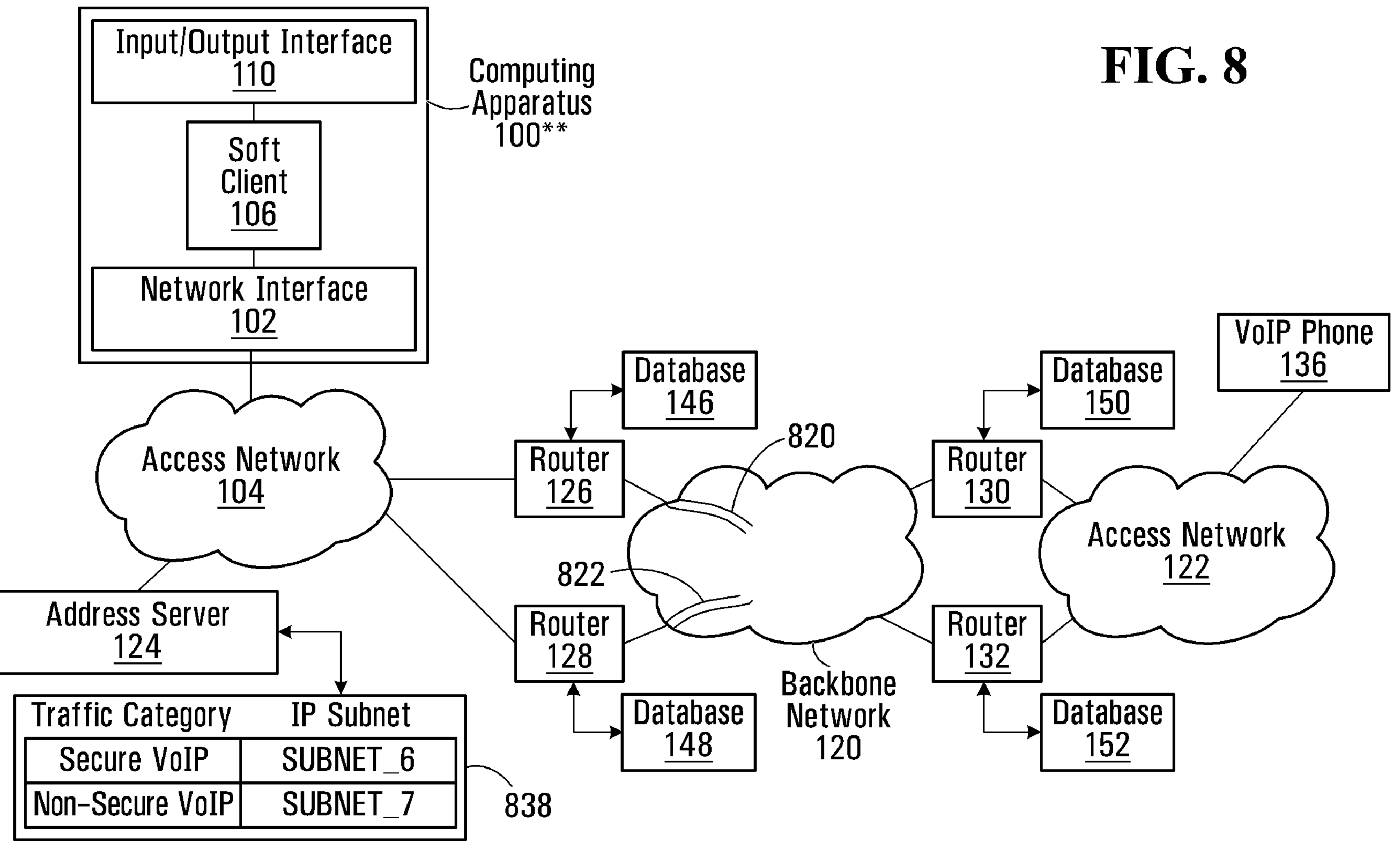

For example, as shown in FIG. 8, the computing apparatus 100 may execute a soft client 106 that handles VoIP traffic which can be secure or non-secure. The computing apparatus 100** may or may not execute other functional entities such as the aforementioned Internet browser (previously referred to by the numeral 108**). In this example, secure VoIP traffic represents one differentiated traffic category, while non-secure VoIP traffic corresponds to another differentiated traffic category.

A database 838 stores an association between each differentiated traffic category and a corresponding subnet for that traffic category. Specifically, the database 838 associates secure VoIP traffic destined for the soft client 106 with a secure subnet SUBNET_6 and non-secure VoIP traffic destined for the soft client 106 with a non-secure subnet SUBNET_7.

Moreover, in this example, secure VoIP traffic and non-secure VoIP traffic are each associated with their own specific routing requirements. For example, the specific routing requirements associated with traffic destined for any IP address in the secure VoIP subnet SUBNET_6 may require routing in accordance with an explicit route, whereas the specific routing requirements for traffic destined for any IP address in the non-secure VoIP subnet SUBNET_7 may call for routing in accordance with a minimum delay criterion. As a result, a path—shown in part as 820—will be reserved for non-secure VoIP traffic (i.e., packets having an assigned IP address in the non-secure VoIP subnet), while another path—shown in part as 822—will be reserved for secure VoIP traffic (i.e., packets having an assigned IP address in the secure VoIP subnet).

In order to take full advantage of the specific routing requirements associated with traffic in the secure VoIP and non-secure VoIP traffic categories, the address requests issued by (or on behalf of) the soft client 106 should each include an indicator instrumental in causing the address server 124 to assign an IP address from the appropriate subnet.

Of note is the fact that even though both types of VoIP traffic terminate at the soft client 106, the specific routing requirements associated with secure VoIP traffic and the non-secure VoIP traffic cause the packets destined for the corresponding subnet to be routed differently. As a result, subscribers can be offered a secure VoIP service on top of a traditional VoIP service.

Figure 9:
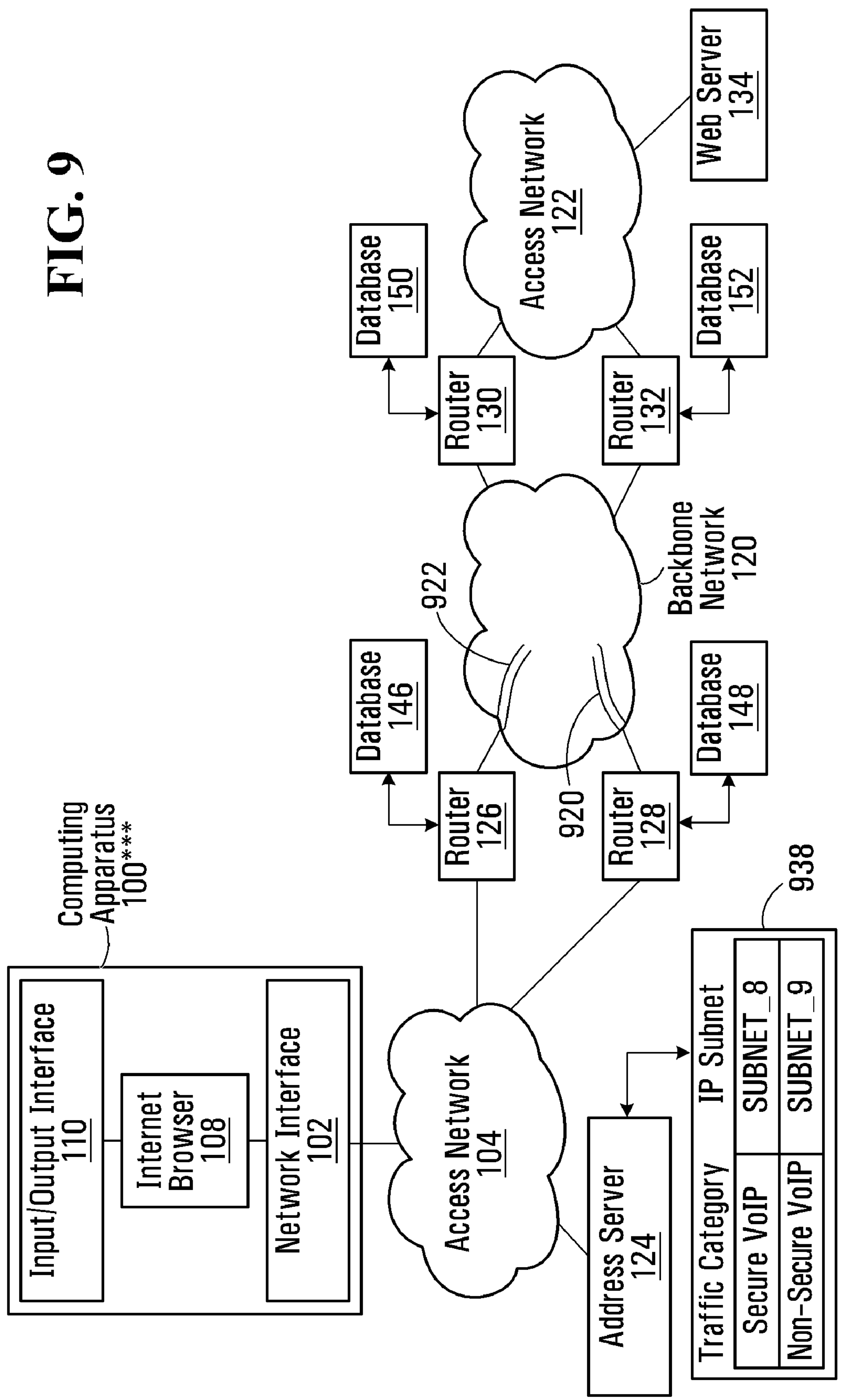

The above-described concept of providing secure and non-secure VoIP services can also be applied to the realm of data. For example, as shown in FIG. 9, the computing apparatus 100* may execute an Internet browser 108 or other data handling application which can be secure or non-secure. The computing apparatus 100*** may or may not execute other functional entities such as the aforementioned soft client (previously referred to by the numeral 106**). In this example, secure data traffic represents one differentiated traffic category, while non-secure data traffic corresponds to another differentiated traffic category.

A database 938 stores an association between each differentiated traffic category and a corresponding subnet for that traffic category. Specifically, the database 938 associates secure data traffic destined for the Internet browser 108 (or other data handling application) with a secure subnet SUBNET_8 and non-secure data traffic destined for the Internet browser 108 (or other data handling application) with a non-secure subnet SUBNET_9.

Moreover, in this example, secure data traffic and non-secure data traffic are each associated with their own specific routing requirements. For example, the specific routing requirements associated with traffic destined for any IP address in the secure data subnet SUBNET_8 may require routing in accordance with an explicit route, whereas the specific routing requirements for traffic destined for any IP address in the non-secure data subnet SUBNET_9 may call for routing in accordance with a minimum delay criterion.

Thus, a path—shown in part as 920—applies to non-secure data traffic (i.e., packets having an assigned IP address in the non-secure data subnet), while another path—shown in part as 922—applies to secure data traffic (i.e., packets having an assigned IP address in the secure data subnet).

In order to take full advantage of the specific routing requirements associated with traffic in the secure data and non-secure data traffic categories, the address requests issued by (or on behalf of) the Internet browser 108 (or other data handling application) should each include an indicator instrumental in causing the address server 124 to assign an IP address from the appropriate subnet.

Of note is the fact that even though both types of data traffic terminate at the Internet browser 108 (or other data handling application), the specific routing requirements associated with secure data traffic and the non-secure data traffic cause the packets destined for the corresponding subnet to be routed differently. As a result, subscribers can be offered a secure data service on top of a traditional data service.

The above-described concept of providing secure and non-secure VoIP services as well as secure and non-secure data services can be combined in an offering whereby secure data traffic exchanged with an Internet browser is associated with a first differentiated traffic category, other data traffic exchanged with the Internet browser is associated with a second differentiated traffic category and VoIP traffic exchanged with a soft client is associated with a third differentiated traffic category. In this way, more expensive and/or more secure links in the backbone network 120 can be reserved for the transmission of sensitive data traffic such as data exchanged over a corporate intranet, whereas other, less expensive and/or less secure links in the backbone network 120 can be used for VoIP traffic and the other non-secure traffic.

Still further variants and combinations will be apparent to those of skill in the art. Thus, while specific embodiments of the present invention have been described and illustrated, it will be apparent to those skilled in the art that numerous modifications and variations can be made without departing from the scope of the invention as defined in the appended claims.

What is claimed is:

1. An apparatus, comprising:

a first functional entity operable for supporting traffic in a first traffic category across a communications network;

a second functional entity operable for supporting traffic in a second traffic category across the communications network, the second traffic category being associated with specific routing requirements through the communications network; and a network interface operable for:

releasing a request for a first address which, when received from an address-assigning entity, enables the first functional entity to act as a receptor of traffic in the first traffic category that is destined for the apparatus;

releasing a request for a second address which, when received from the address-assigning entity, enables the second functional entity to act as a receptor of traffic in the second traffic category that is destined for the apparatus;

wherein said request for a second address comprises data instrumental in causing the second address to be assigned by the address-assigning entity from a particular set of at least one address;

wherein the communications network is pre-configured to route traffic destined for a given address in the particular set of at least one address in accordance with said specific routing requirements.

2. The apparatus defined in claim 1, wherein said specific routing requirements comprise a requirement for traffic in the second traffic category to be routed securely through the communications network.

3. The apparatus defined in claim 2, wherein the first and second functional entities implement a VoIP soft client.

4. The apparatus defined in claim 2, wherein the first and second functional entities implement a data handling application.

5. The apparatus defined in claim 1, wherein said specific routing requirements comprise a requirement for traffic in the second traffic category to reach a designated network element in the communications network.

6. The apparatus defined in claim 5, wherein the designated network element comprises a quarantine server.

7. The apparatus defined in claim 6, wherein the second functional entity implements an electronic mail application.

8. The apparatus defined in claim 5, wherein the designated network element comprises a real-time packet filter.

9. The apparatus defined in claim 8, wherein the second functional entity implements an Internet browser.

10. The apparatus defined in claim 1, wherein said specific routing requirements comprise a requirement for traffic in the second traffic category to follow an explicit route through the communications network.

11. The apparatus defined in claim 1, wherein the specific routing requirements comprise a priority level associated with traffic in the second traffic category.

12. The apparatus defined in claim 1, wherein the first functional entity and the second functional entity are different.

13. The apparatus defined in claim 12, wherein the second functional entity implements a VoIP soft client.

14. The apparatus defined in claim 13, wherein the first functional entity implements an Internet browser.

15. The apparatus defined in claim 12, wherein the second functional entity implements an Internet browser.

16. The apparatus defined in claim 12, wherein the second functional entity implements an electronic mail application.

17. The apparatus defined in claim 12, wherein the second functional entity implements an electronic gaming application.

18. The apparatus defined in claim 12, wherein the second functional entity implements a video application.

19. The apparatus defined in claim 1, the specific routing requirements through the communications network being second specific routing requirements, the particular set of at least one address being a second set of at least one address, wherein the first traffic category is associated with first specific routing requirements through the communications network, wherein said request for a first address comprises data instrumental in causing the first address to be assigned by the address-assigning entity from a first set of at least one address.

20. The apparatus defined in claim 19, wherein said first specific routing requirements comprise a requirement for traffic in the first traffic category to be routed through the communications network in accordance with a first security criterion, and wherein said second specific routing requirements comprise a requirement for traffic in the second traffic category to be routed through the communications network in accordance with a second security criterion different from the first security criterion.

21. The apparatus defined in claim 20, wherein the first functional entity and the second functional entity are the same.

22. The apparatus defined in claim 21, wherein the first and second functional entities implement a VoIP soft client.

23. The apparatus defined in claim 21, wherein the first and second functional entities implement a data handling application.

24. The apparatus defined in claim 20, wherein the first functional entity and the second functional entity are different.

25. The apparatus defined in claim 24, wherein the first functional entity implements a VoIP soft client and wherein the second functional entity implements a data handling application.

26. The apparatus defined in claim 25, wherein the second security criterion represents a higher level of security than the first security criterion.

27. The apparatus defined in claim 19, the apparatus further comprising:

a third functional entity operable for supporting traffic in a third traffic category across the communications network, the third traffic category being associated with third specific routing requirements through the communications network;

said network interface being operable for releasing a request for a third address which, when received from the address-assigning entity, enables the third functional entity to act as a receptor of traffic in the third traffic category that is destined for the apparatus;

wherein said request for a third address comprises data instrumental in causing the third address to be assigned by the address-assigning entity from a third set of at least one address;

wherein the communications network is pre-configured to route traffic destined for a given address in the third set of at least one address in accordance with said third specific routing requirements.

28. The apparatus defined in claim 27, wherein the first, second and third functional entities are selected from the group consisting of a VoIP soft client, an Internet browser, an electronic mail application, an electronic gaming application and a video application.

29. The apparatus defined in claim 1, wherein the first and second addresses are IP addresses.

30. The apparatus defined in claim 29, wherein the particular set of at least one address comprises a plurality of IP addresses.

31. The apparatus defined in claim 30, wherein the plurality of IP address are contiguous.

32. The apparatus defined in claim 1, wherein said data instrumental in causing the second address to be assigned by an address-assigning entity from a particular set of at least one address comprises an indicator associated with the second traffic category.

33. The apparatus defined in claim 1, wherein said releasing a request for a second address comprises:

receiving an original address request from the second functional entity;

recognizing that the second functional entity supports the second traffic category;

appending to the original address request said data instrumental in causing the second address to be assigned by an address-assigning entity from a particular set of at least one address, thereby to create said request for a second address.

34. The apparatus defined in claim 1, wherein said releasing a request for a second address comprises receiving the request for a second address from the second functional entity and forwarding the request for a second address to the address-assigning entity.

35. The apparatus defined in claim 1, further comprising an intermediate software component, the intermediate software component being operable to:

receive an original address request from the second functional entity;

recognize that the second functional entity supports the second traffic category;

append to the original address request said data instrumental in causing the second address to be assigned by an address-assigning entity from a particular set of at least one address, thereby to create said request for a second address;

forward said request for a second address to the network interface.

36. The apparatus defined in claim 1, further comprising an intermediate software component, the intermediate software component being operable to:

receive an original address request from the second functional entity, the original address request containing a data element indicative of an address of the apparatus;

recognize that the second functional entity supports the second traffic category;

modify the data element to reflect said data instrumental in causing the second address to be assigned by an address-assigning entity from a particular set of at least one address, thereby to create said request for a second address;

forward said request for a second address to the network interface.

37. The apparatus defined in claim 1, wherein the communications network is an Internet backbone network.

38. The apparatus defined in claim 1, further comprising an input/output interface for allowing a set of at least one external peripheral device to communicate traffic in the first traffic category and traffic in the second traffic category.

39. The apparatus defined in claim 1, wherein said network interface is implemented as a PC network interface card.

40. A network architecture, comprising:

a plurality of routers capable of routing traffic through a backbone network, the routers being configured to route traffic destined for a given address in a particular set of at least one address in accordance with specific routing requirements;

a computing apparatus, comprising:

a first functional entity operable for supporting traffic in a first traffic category across the backbone network;

a second functional entity operable for supporting traffic in a second traffic category across the backbone network, the second traffic category being associated with said specific routing requirements through the backbone network; and a network interface operable for:

releasing a request for a first address which, when received from an address-assigning entity, enables the first functional entity to act as a receptor of traffic in the first traffic category that is destined for the computing apparatus;

releasing a request for a second address which, when received from the address-assigning entity, enables the second functional entity to act as a receptor of traffic in the second traffic category that is destined for the computing apparatus;

wherein said request for a second address comprises data instrumental in causing the second address to be assigned by the address-assigning entity from said particular set of at least one address.

41. The network architecture defined in claim 40, wherein said specific routing requirements comprise a requirement for traffic in the second traffic category to be routed securely through the backbone network.

42. The network architecture defined in claim 41, wherein the first and second functional entities implement a VoIP soft client.

43. The network architecture defined in claim 41, wherein the first and second functional entities implement a data handling application.

44. The network architecture defined in claim 40, wherein said specific routing requirements comprise a requirement for traffic in the second traffic category to reach a designated network element in the backbone network.

45. The network architecture defined in claim 44, wherein the designated network element comprises a quarantine server.

46. The network architecture defined in claim 45, wherein the second functional entity implements an electronic mail application.

47. The network architecture defined in claim 44, wherein the designated network element comprises a real-time packet filter.

48. The network architecture defined in claim 47, wherein the second functional entity implements an Internet browser.

49. The network architecture defined in claim 40, wherein said specific routing requirements comprise a requirement for traffic in the second traffic category to follow an explicit route through the backbone network.

50. The network architecture defined in claim 40, wherein the specific routing requirements comprise a priority level associated with traffic in the second traffic category.

51. The network architecture defined in claim 40, wherein the first functional entity and the second functional entity are different.

52. The network architecture defined in claim 51, wherein the second functional entity implements a VoIP soft client.

53. The network architecture defined in claim 52, wherein the first functional entity implements an Internet browser.

54. The network architecture defined in claim 51, wherein the second functional entity implements an Internet browser.

55. The network architecture defined in claim 51, wherein the second functional entity implements an electronic mail application.

56. The network architecture defined in claim 51, wherein the second functional entity implements an electronic gaming application.

57. The network architecture defined in claim 51, wherein the second functional entity implements a video application.

58. The network architecture defined in claim 40, the specific routing requirements through the backbone network being second specific routing requirements, the particular set of at least one address being a second set of at least one address, wherein the first traffic category is associated with first specific routing requirements through the backbone network, wherein said request for a first address comprises data instrumental in causing the first address to be assigned by the address-assigning entity from a first set of at least one address.

59. The network architecture defined in claim 58, wherein said first specific routing requirements comprise a requirement for traffic in the first traffic category to be routed through the backbone network in accordance with a first security criterion, and wherein said second specific routing requirements comprise a requirement for traffic in the second traffic category to be routed through the backbone network in accordance with a second security criterion different from the first security criterion.

60. The network architecture defined in claim 59, wherein the first functional entity and the second functional entity are the same.

61. The network architecture defined in claim 60, wherein the first and second functional entities implement a VoIP soft client.

62. The network architecture defined in claim 60, wherein the first and second functional entities implement a data handling application.

63. The network architecture defined in claim 59, wherein the first functional entity and the second functional entity are different.

64. The network architecture defined in claim 63, wherein the first functional entity implements a VoIP soft client and wherein the second functional entity implements a data handling application.

65. The network architecture defined in claim 64, wherein the second security criterion represents a higher level of security than the first security criterion.

66. The network architecture defined in claim 58, the computing apparatus further comprising:

a third functional entity operable for supporting traffic in a third traffic category across the backbone network, the third traffic category being associated with third specific routing requirements through the backbone network;

said network interface being operable for releasing a request for a third address which, when received from the address-assigning entity, enables the third functional entity to act as a receptor of traffic in the third traffic category that is destined for the computing apparatus;

wherein said request for a third address comprises data instrumental in causing the third address to be assigned by the address-assigning entity from a third set of at least one address;

wherein the routers are configured to route traffic destined for a given address in the third set of at least one address in accordance with said third specific routing requirements.

67. The network architecture defined in claim 66, wherein the first, second and third functional entities are selected from the group consisting of a VoIP soft client, an Internet browser, an electronic mail application, an electronic gaming application and an IPTV application.

68. The network architecture defined in claim 40, wherein the first and second addresses are IP addresses.

69. The network architecture defined in claim 68, wherein the particular set of at least one address comprises a plurality of IP addresses.

70. The network architecture defined in claim 69, wherein the particular set of at least one address comprises an IP address subnet.

71. The network architecture defined in claim 40, wherein said data instrumental in causing the second address to be assigned by an address-assigning entity from a particular set of at least one address comprises an indicator associated with the second traffic category.

72. The network architecture defined in claim 40, wherein said releasing a request for a second address comprises:

receiving an original address request from the second functional entity;

recognizing that the second functional entity supports the second traffic category;

appending to the original address request said data instrumental in causing the second address to be assigned by an address-assigning entity from a particular set of at least one address, thereby to create said request for a second address.

73. The network architecture defined in claim 40, wherein said releasing a request for a second address comprises receiving the request for a second address from the second functional entity and forwarding the request for a second address to the address-assigning entity.

74. The network architecture defined in claim 40, further comprising an intermediate software component, the intermediate software component being operable to:

receive an original address request from the second functional entity;

recognize that the second functional entity supports the second traffic category;

append to the original address request said data instrumental in causing the second address to be assigned by an address-assigning entity from a particular set of at least one address, thereby to create said request for a second address;

forward said request for a second address to the network interface.

75. The network architecture defined in claim 40, further comprising an intermediate software component, the intermediate software component being operable to:

receive an original address request from the second functional entity, the original address request containing a data element indicative of an address of the computing apparatus;

recognize that the second functional entity supports the second traffic category;

modify the data element to reflect said data instrumental in causing the second address to be assigned by an address-assigning entity from a particular set of at least one address, thereby to create said request for a second address;

forward said request for a second address to the network interface.

* * * * *